United States Patent [19]

Albaric

[11] 4,206,378
[45] Jun. 3, 1980

[54] SYSTEM FOR LIQUIDLY COOLING DYNAMOELECTRIC MACHINE ROTOR COILS

[75] Inventor: Jacques E. Albaric, Fontainebleau, France

[73] Assignee: Westinghouse Electric Corp., Pittsburgh, Pa.

[21] Appl. No.: 877,779

[22] Filed: Feb. 14, 1978

[51] Int. Cl.² ............................................. H02K 1/32
[52] U.S. Cl. ...................................... 310/61; 310/64
[58] Field of Search ..................... 310/54, 64, 59, 58, 310/60, 65, 61, 62, 270

[56] References Cited

U.S. PATENT DOCUMENTS

| | | | |
|---|---|---|---|
| 3,131,321 | 4/1964 | Gibbs | 310/54 |
| 3,249,775 | 5/1966 | Baylac | 310/54 |
| 3,487,243 | 12/1969 | Wiedemann | 310/54 |
| 3,652,882 | 3/1972 | Elliot | 310/62 |
| 3,718,830 | 2/1973 | Philofsky | 310/64 |
| 3,733,502 | 5/1973 | Curtis | 310/61 |
| 3,740,596 | 6/1973 | Curtis | 310/54 |
| 3,818,256 | 6/1974 | Ying | 310/59 |
| 3,870,913 | 3/1975 | Shapiro | 310/54 |
| 3,908,140 | 9/1975 | Fidei | 310/54 |
| 4,114,058 | 9/1978 | Abhric | 310/54 |

Primary Examiner—R. Skudy
Attorney, Agent, or Firm—J. W. Keen

[57] ABSTRACT

A system for liquidly cooling rotor coils whose end turns are embedded in the rotor. A distribution chamber and a discharge chamber are arranged on opposite axial ends of the rotor and constitute supply and return manifolds, respectively. The distribution and discharge chambers are fluidly connected to coolant conduits which promote heat transfer to coolant flowing therein from electrical coils disposed in slots formed on the surface of the rotor. The fluid connections include conduits with at least a portion thereof being disposed in longitudinal slots of the rotor. Each of the coolant conduits has at least one 90° bend therein for alleviating conduit stresses imposed by thermal expansion of such conduits. Insulators for the conduits electrically isolate the distribution and discharge chambers from the rotor's electrical coils. Coolant conduits supplying coolant to and receiving coolant from electrical coils near each pole may be disposed in the slots radially inside or outside the coils. For coolant conduits disposed radially outside the coils, rigid channel members are utilized to prevent conduit deformation during rotor rotation.

10 Claims, 17 Drawing Figures

SYSTEM FOR LIQUIDLY COOLING DYNAMOELECTRIC MACHINE ROTOR COILS

BACKGROUND OF THE INVENTION

1. Field of the Invention

This invention relates to dynamoelectric machines, and more particularly, to means for liquidly cooling the field winding thereof.

2. Description of the Prior Art

Dynamoelectric machines, such as turbine generators, are often designed such that the steel in their rotors is operated near magnetic saturation. Rating increases for dynamoelectric machines of given size operated near such limit are made possible only by raising the magnetic saturation limit of the rotor. The magnetic saturation limit of a dynamoelectric machine's rotor can be increased by reducing the depth of coil slots formed in the rotor. Liquidly cooled coils can be operated at higher excitation current levels than those which are gas cooled and, thus, liquid coolant permits the use of shallower coil slots than are required by gas coolant. In general, the superior cooling properties of liquid coolant over those of gaseous coolant permit the higher $I^2R$ losses in liquidly cooled coils to be carried away so as to maintain the temperature in the rotor below the critical temperature at which the coil's insulation loses adequate strength and the electrical conductors lose adequate fatigue resistance properties. It can be shown that liquidly cooled rotors can increase generator efficiency substantially over equivalently sized gaseous cooled rotors.

Transmitting liquid coolant to, through, and from rotor coils requires the use of conduits. Conventional manifolding techniques for distribution and collection of the liquid coolant would involve disposing distribution and discharge chambers at axially opposite ends of the rotor. The previously mentioned conduits connect the respective chambers to the heat generating rotor coils. Conventional generator rotor construction utilizes retaining ring structures at both axial ends of a rotor to restrain radial movement of coil end turns in making their turnaround between longitudinal slots situated on opposite circumferential sides of the particular rotor pole. Use of such conduits between the chambers and rotor coils requires securing those conduits along with the insulation which isolates the coils from the chambers, radially beneath the retaining rings. As such, liquid coolant leaks or electrical grounds are difficult to locate and very expensive to correct. Other inconveniences and disadvantages of the end turn retaining rings which are customarily shrunk-fit onto the ends of generator rotors include undesirable bending stresses in the copper rotor coils resulting from cycling deflection of the retaining rings, increased difficulty in bracing the liquid coolant conduits, and increased complexity in assembling and disassembling the end plates which help maintain the retaining ring's round configuration. Such greater complexity results from the requirement that the plates clear the rotor shaft during assembly and disassembly so as to avoid interfering with the conduits and their insulators.

Elimination of generator retaining rings is therefore believed desirable, and is, in fact, disclosed in copending Westinghouse Electric Case No. 44,973, whose Ser. No. is 877,778, and filing date is Feb. 14, 1978. Elimination of such retaining rings and introduction of embedded field winding end turns necessitates development of a cooling scheme which is compatible therewith.

SUMMARY OF THE INVENTION

In general, an improved dynamoelectric machine comprising a rotor member having a plurality of intersecting longitudinal and circumferential slots formed on its surface about a plurality of poles, a plurality of electrical coils being receivable in said slots and means for cooling the electrical coils with liquid coolant. The liquid coolant means include coolant distribution and discharge chambers situated on opposite axial ends of the rotor with both chambers being fluidly connected through a plurality of conduits to coolant openings in the electrical coils. Both coolant chambers are electrically insulated from the electrical coils and act as manifolds to the conduits connecting them to the electrical coils' coolant openings. The conduits include an angle of 90° are less to minimize thermally induced stresses incurred therein and have at least a portion thereof disposed in said rotor slots.

BRIEF DESCRIPTION OF THE DRAWINGS

The objects and advantages of this invention will be more apparent from reading the following detailed description in connection with the accompanying drawings, in which.

DESCRIPTION OF THE PREFERRED EMBODIMENT

Figure 1D:
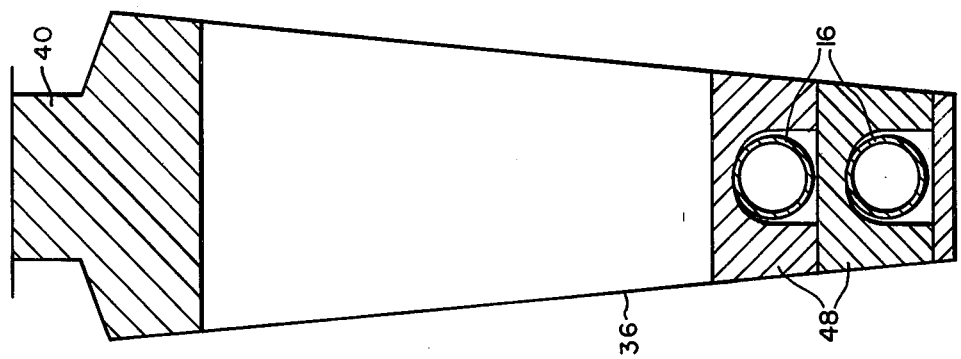
FIGS. 1A through 1D are sectional views of single rotor slots with electrical coils disposed therein.
Figure 1C:
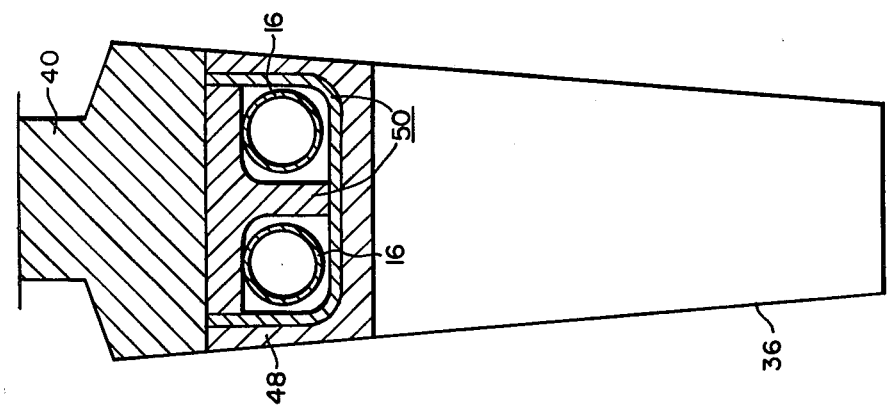
Figure 1B:
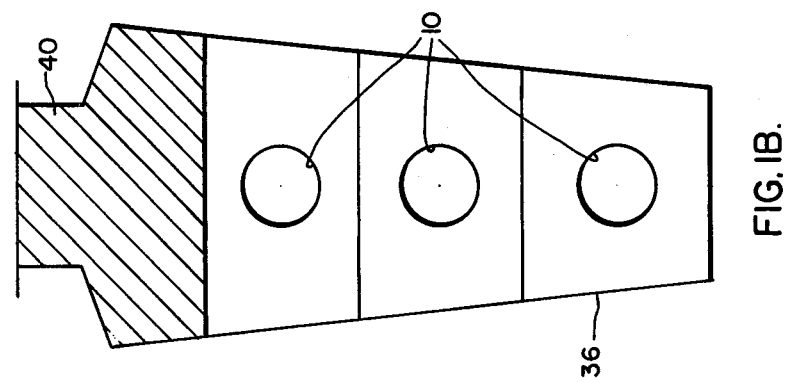
Figure 1A:
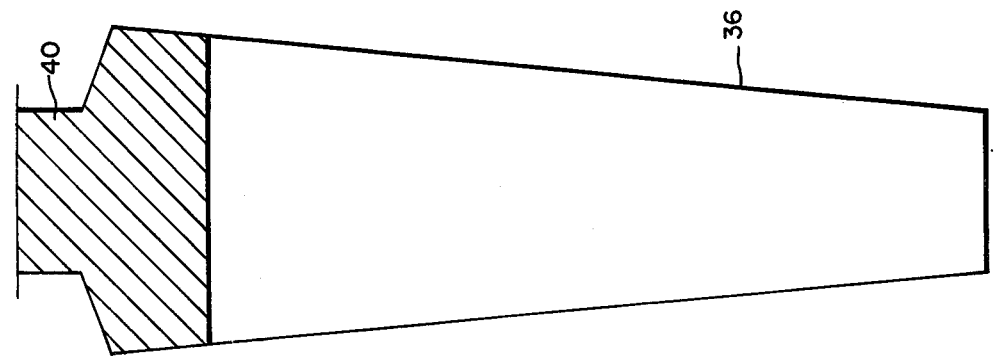

Referring now to the drawings in detail, FIG. 1A illustrates the actual cross-sectional size of a rotor slot in a 46" diameter rotor of a 1700 MVA gas cooled generator. FIG. 1B illustrates the cross-sectional configuration of a rotor slot and conductors disposed therein for a liquid cooled rotor of a 1700 MVA generator with a 46" diameter rotor. In particular, the liquid coolant used in FIGS. 1A and 1B is preferably high purity water. As can be seen in comparing FIGS. 1A and 1B, the slot depth of the water cooled rotor is much less than the slot depth for the gas cooled rotor, and thus permits higher excitation currents to be used before the rotor's magnetic saturation limit is reached. As such, greater generator ratings can be obtained for water cooled rotors than gas cooled rotors of the same size. Passageways or openings 10 in the conductors disposed in the rotor slots transmit liquid coolant therethrough and permit removal of heating losses sustained in those coils.

Figure 2:
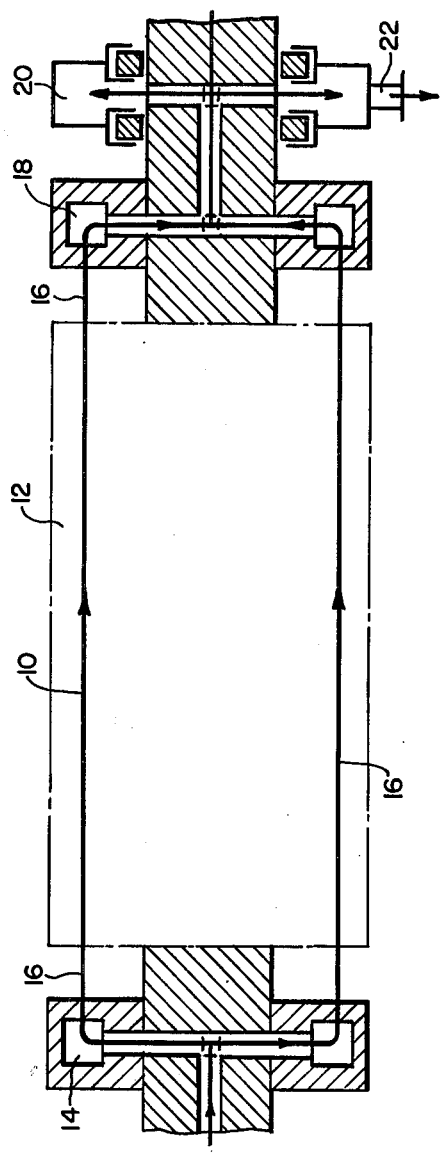
FIG. 2 is a schematic view of a proposed liquid cooling scheme for dynamoelectric machine rotors.

FIG. 2 is a schematic illustration of a rotor 12 and the liquid cooling scheme incorporated therein. Liquid coolant enters coolant distribution chamber 14 and is manifolded therefrom through a plurality of conduits 16. Coolant conduits 16 provide fluid communication to and from coolant openings 10 which extend through the electrical coils. Coolant openings 10 are usually integrally disposed within the coils to promote heat transfer between the electrical coils and the liquid coolant flowing therethrough. Coolant discharge chamber 18 is situated at the opposite axial end of rotor 12 from distribution chamber 14 and acts as a manifold for collecting head laden coolant which has exited coolant openings 10 and passed through coolant conduits 16. The heat laden coolant is then transmitted to a stationary discharge chamber 20 which discharges that coolant through conduit 22. Such heat laden coolant may be cooled and recirculated or discharged to waste.

Figure 3:
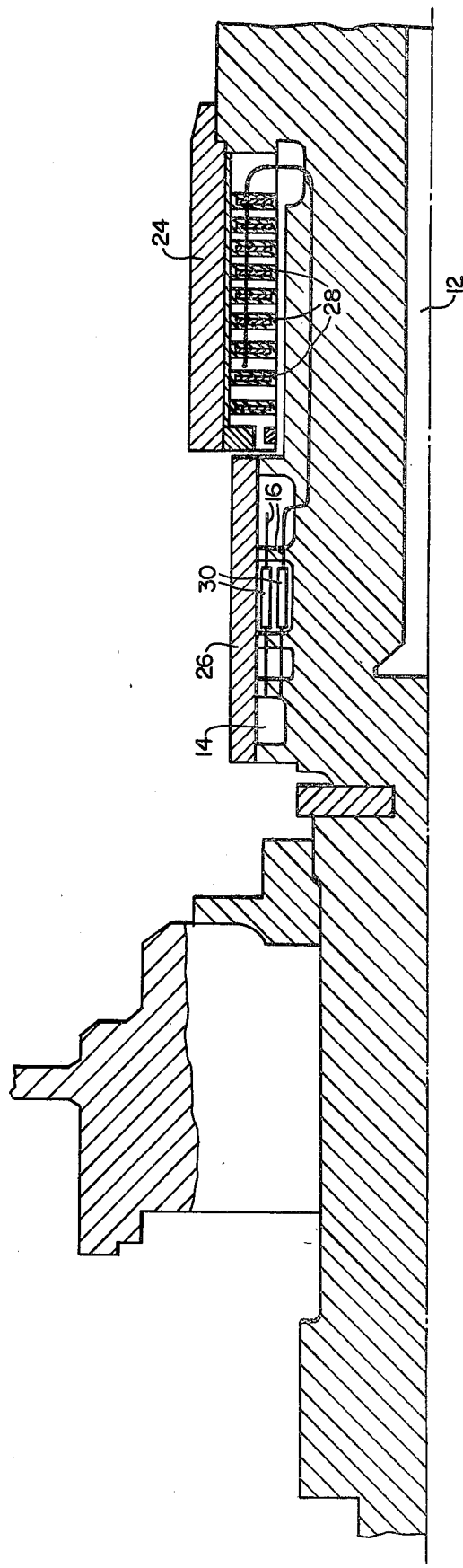
FIG. 3 is a partial sectional view of a liquid cooling scheme for a rotor of conventional construction.

FIG. 3 is a partial sectional view of one end of a generator rotor 12 which utilizes liquid cooling and has retaining rings 24 and 26 which respectively constrain movement of rotor coil end turns 28, coolant conduits 16, and associated insulators 30. Coolant conduits 16 are typically stainless steel and are constructed to have segments which meet at angles of 90 or less degrees so as to be flexible enough to withstand the thermal expansion of the coils and cyclic, rotationally induced deflection of the retaining rings 24 and 26. A major disadvantage, however, of the conventional rotor construction's retaining rings illustrated in FIG. 3 is that access to insulators 30 and associated coolant conduits 16 is obstructed by retaining ring 26 which makes coolant leaks and electrical grounds difficult to locate and expensive to correct. Even when generator rotor 12 is engineered with high care and manufactured with extreme precision, failures such as the previously mentioned ones can occur and must be corrected. Thus, placement of the liquid coolant system radially inside retaining ring 26 could result in time consuming and expensive repairs if such repairs became necessary.

Figure 4:
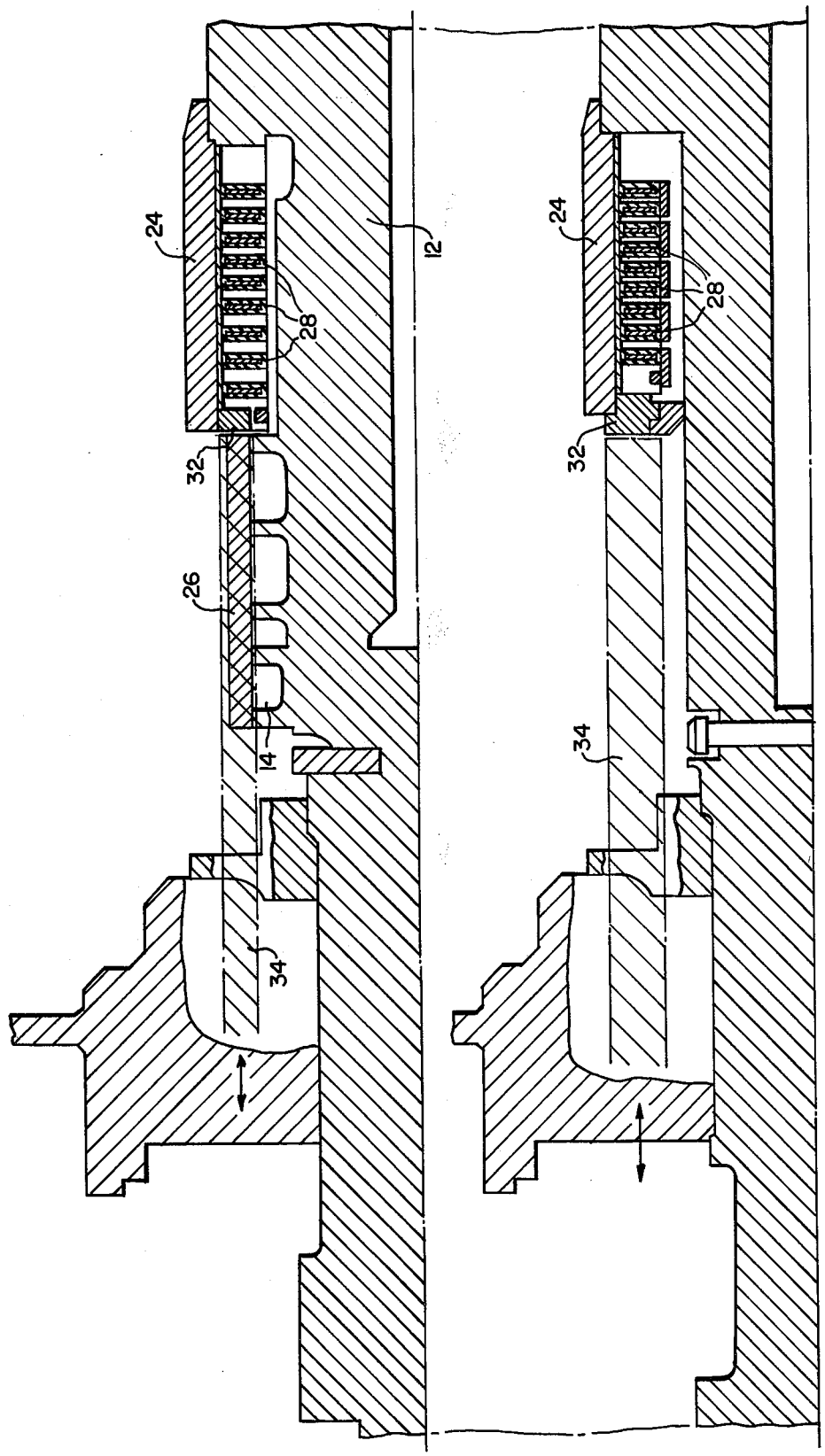
FIG. 4 is a partial sectional view of the conventional dynamoelectric machine rotor illustrating the areas about the rotor which must be maintained free of obstacles during assembly and disassembly.

A one piece end plate 32 helps maintain retaining ring 24 in a round configuration even with the skewed loading applied by the end turns which conventionally extend past the axial end of rotor 12. Assembly and disassembly of end plate 32 from rotor 12 requires it to pass axially relative to the rotor and displace a volume situated about the rotor which is indicated as being interference volume 34. As may be seen from a comparison of FIGS. 3 and 4, a portion of volume 34 is coincidental with the space occupied by insulators 30 and coolant conduits 16. Thus, if it is desired to remove end plate 32, insulators 30 and coolant conduits 16 must be disassembled prior thereto.

Figure 5:
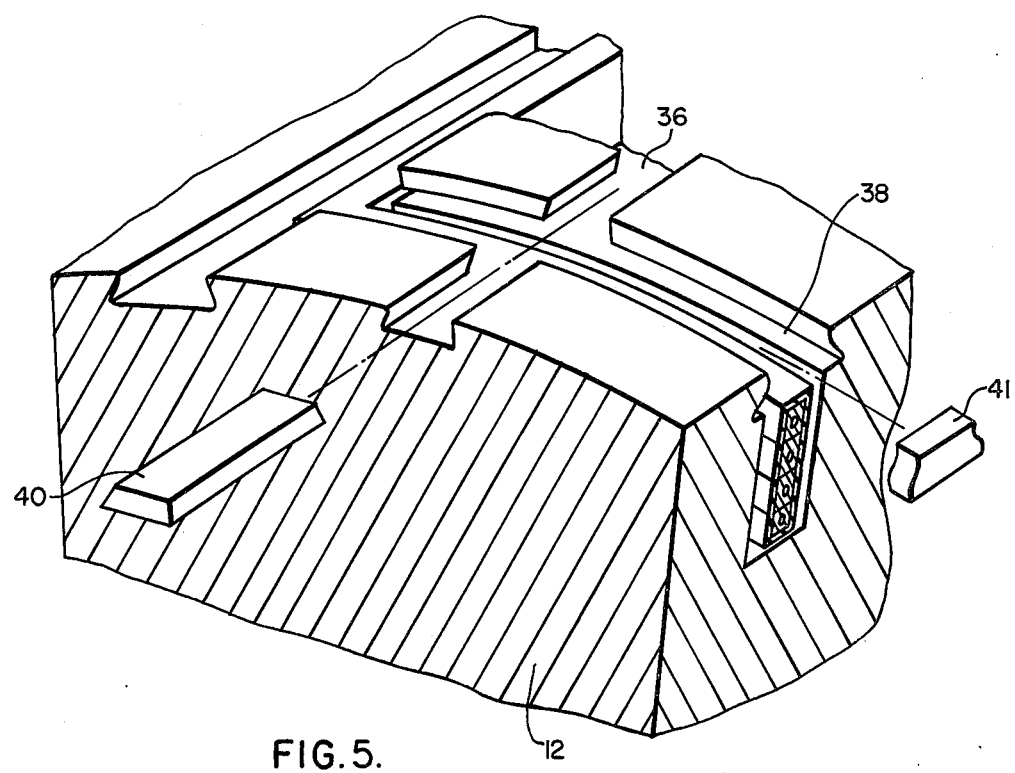
FIG. 5 is a partial pictorial illustration of the rotor slot configuration proposed in the present invention.

FIG. 5 is a partial sectional view of rotor 12 having longitudinal slots 36 and circumferential slots 38. Longitudinal slots 36 house the major portion of the electrical coils (not shown) which constitute the field winding of the dynamoelectric machine. Conventional rotor construction permits extension of the electrical coils disposed in longitudinal slots 38 into the axial end regions of rotor 12. The rotor construction illustrated in FIG. 5, however, permits housing the end turns of the field winding electrical coils in circumferential slots 38. Coil retention in longitudinal slots 36 is obtained by use of axial wedges 40 which enclose the radially outer mouth portion of the longitudinal slots 36. The end turns for the construction shown in FIG. 5 are, however, retained in circumferential slots 38 by circumferential wedges 41 rather than retaining rings 24. Circumferential wedges 41 are, by necessity, shorter than axial wedges 40 since circumferential wedges 41 must be inserted at the intersection of longitudinal and circumferential slots 36 and 38, respectively. Utilization of the rotor construction shown in FIG. 5 permits deletion of retaining rings 24 and thus avoids many of the problems encountered in using them in combination with a liquid coolant system.

Figure 6B:
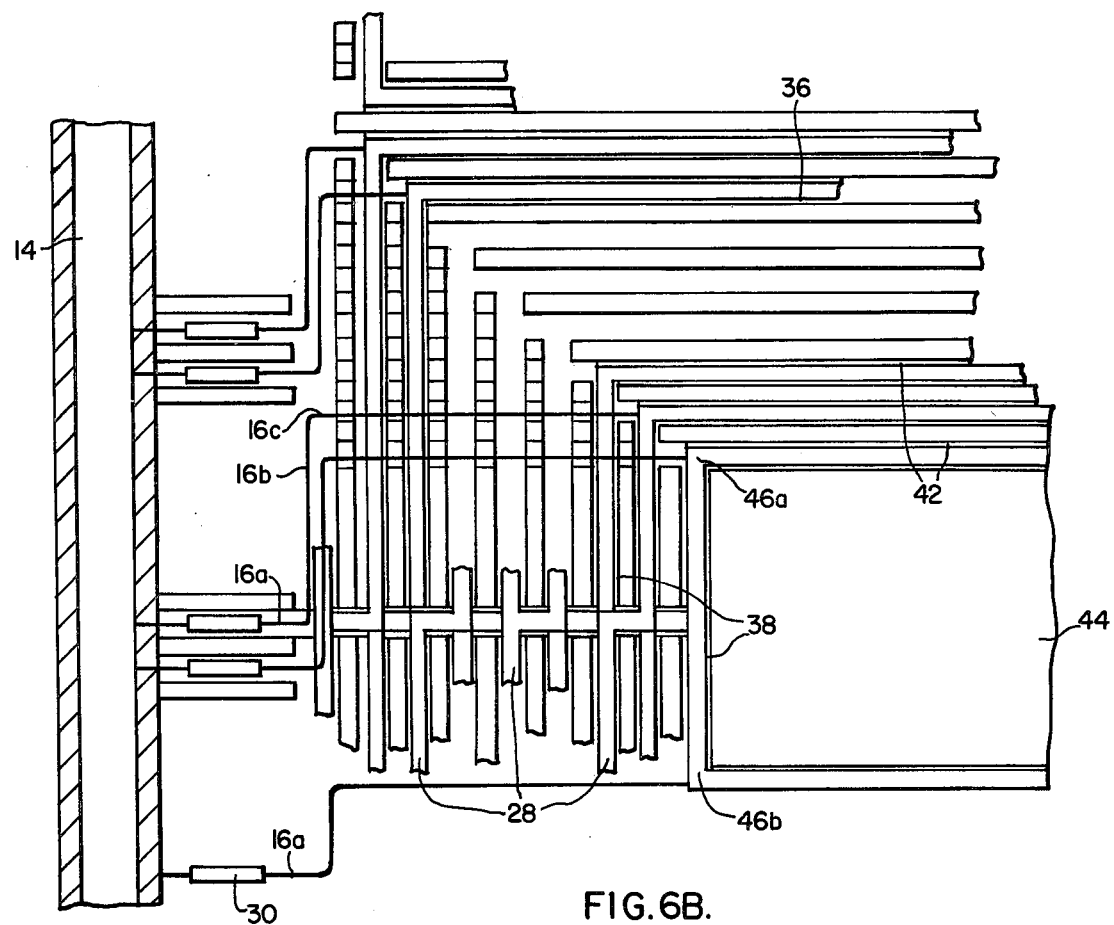
FIGS. 6A and 6B are partial sectional views of a first embodiment of the present invention.
Figure 6A:
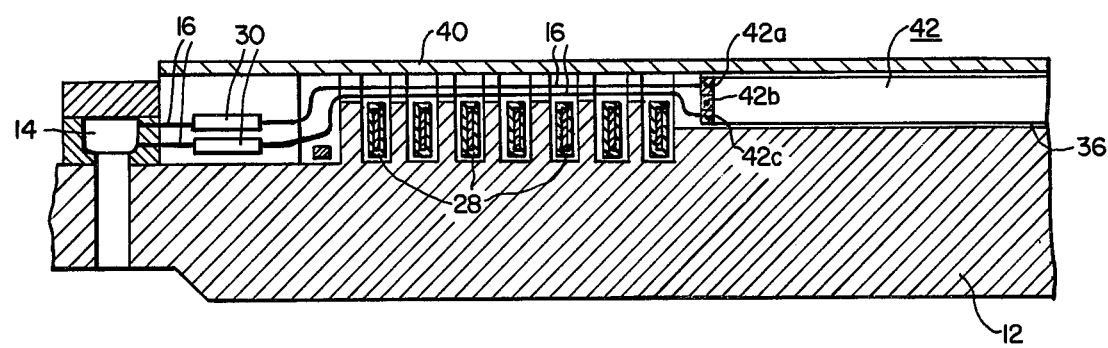

FIG. 6A is a partial, sectional view of a rotor 12 whose construction is identical with that of FIG. 5. Longitudinal wedges 40 constrain longitudinal coil portions 42 in longitudinal slots 36. Coolant conduits 16 lie radially outside of the embedded end turns 28 and are seen to fluidly connect with the coil portions located at the intersection of the longitudinal and circumferential slots 36 and 38, respectively. Such fluid connection is better seen in FIG. 6B where it can be seen that coolant conduits 16 have three segments, 16a, 16b, and 16c, situated between insulator 30 and the coil's coolant connections. Coolant conduit segments 16a and 16c are axially directed, with it being understood that segment 16c lies within longitudinal slot 36. Coolant conduit segment 16b is arcuate in shape and connects segment 16a to 16c, with the connections therebetween constituting compound angles which are, in one plane, 90° or less so as to permit thermal expansion of the field winding coils without sustaining abnormally high stress levels therein. Conductors 42a, 42b, and 42c are seen in FIG. 6A to constitute the innermost coil structure which surrounds pole 44. In the particular embodiment of FIG. 6A, each coil constitutes three conductors 42a, 42b, and 42c, with conductors 42a and 42c being fluidly connected to coolant conduits 16 at one corner 46a of each coil and conductor 42b being fluidly connected to coolant conduits 16 at the other corner 46b of each adjacent coolant distribution chamber 14.

Figure 7B:
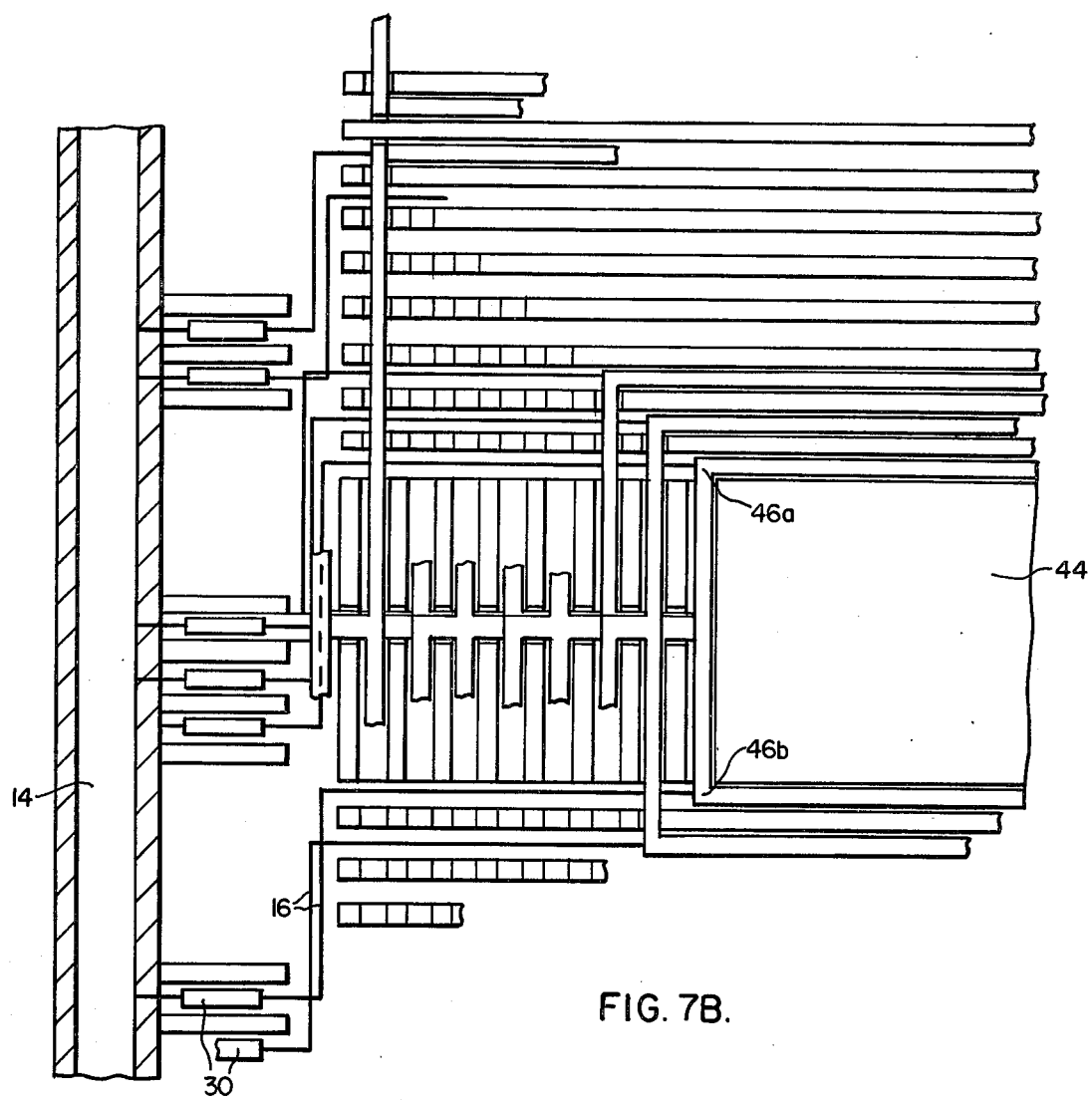
FIGS. 7A and 7B illustrate a second embodiment of the present invention.
Figure 7A:
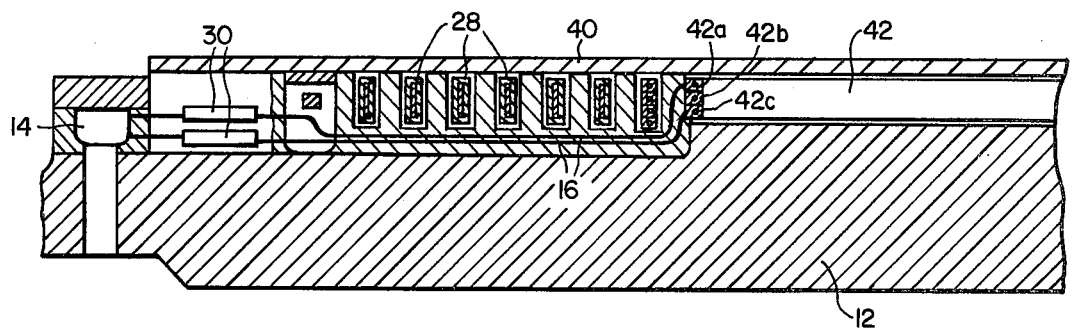

FIGS. 7A and 7B are similar to FIGS. 6A and 6B with the exception that coolant conduits 16 are situated radially inside end turn coils 28. in FIG. 7B coolant conduit connections to conductors 42a and 42c may be seen at coil corner 46a and coolant conduit connection to conductor 42b occurs at coil corner 46b. While three conductors per coil have been illustrated, it is to be understood that a different number could be utilized with appropriate changes in the conduit distribution being made between the coil corners 46a and 46b so as to equalize the connections therewith as much as possible. It is to be further understood that such coolant connections are provided for each coil on the discharge and distribution ends of the rotor 12.

Figure 8:
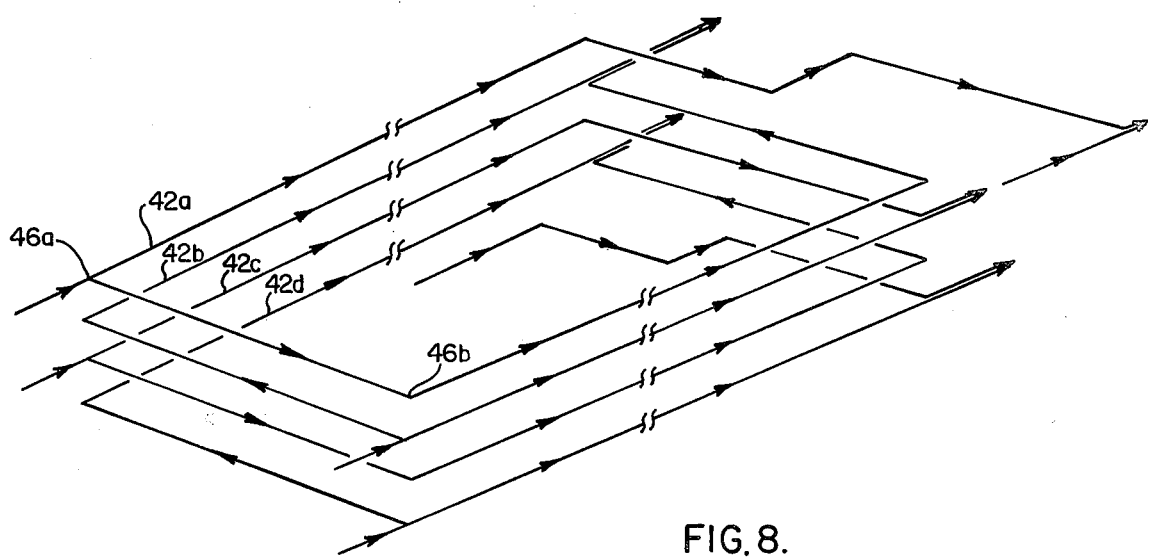
FIG. 8 is a schematic representations of the cooling path used in FIGS. 6A, 6B, 7A and 7B.

FIG. 8 is a schematic illustration of a cooling arrangement like that of FIGS. 6A, 6B, 7A, and 7B, except that FIG. 8 is illustrative of four conductors (42a, 42b, 42c, and 42d) per coil, rather than three as illustrated in the previous figures. Coolant enters conductors 42a and 42c at coil corner 46a and also enters conductors 42b and 42d at coil corner 46b. Thus, in the case of FIG. 8, two coolant conduits are connected to each coil corner so as to minimize and equalize the space requirements in each rotor slot for the coolant conduits 16. FIGS. 1C and 1D show the cross-sectional views of longitudinal slots 36 for the cooling system configurations of FIGS. 6A, 6B and 7A, 7B, respectively. In FIGS. 1C and 1D, coolant conduits 16 are seen to be blocked by structure 48 so as to brace and constrain them. FIG. 1C has an additional structure 50 which is rigid and surrounds the coolant conduits 16. Structure 50 prevents deformation of coolant conduits 16 under the high centrifugal loading which can exist during rotor rotation.

Figure 9B:
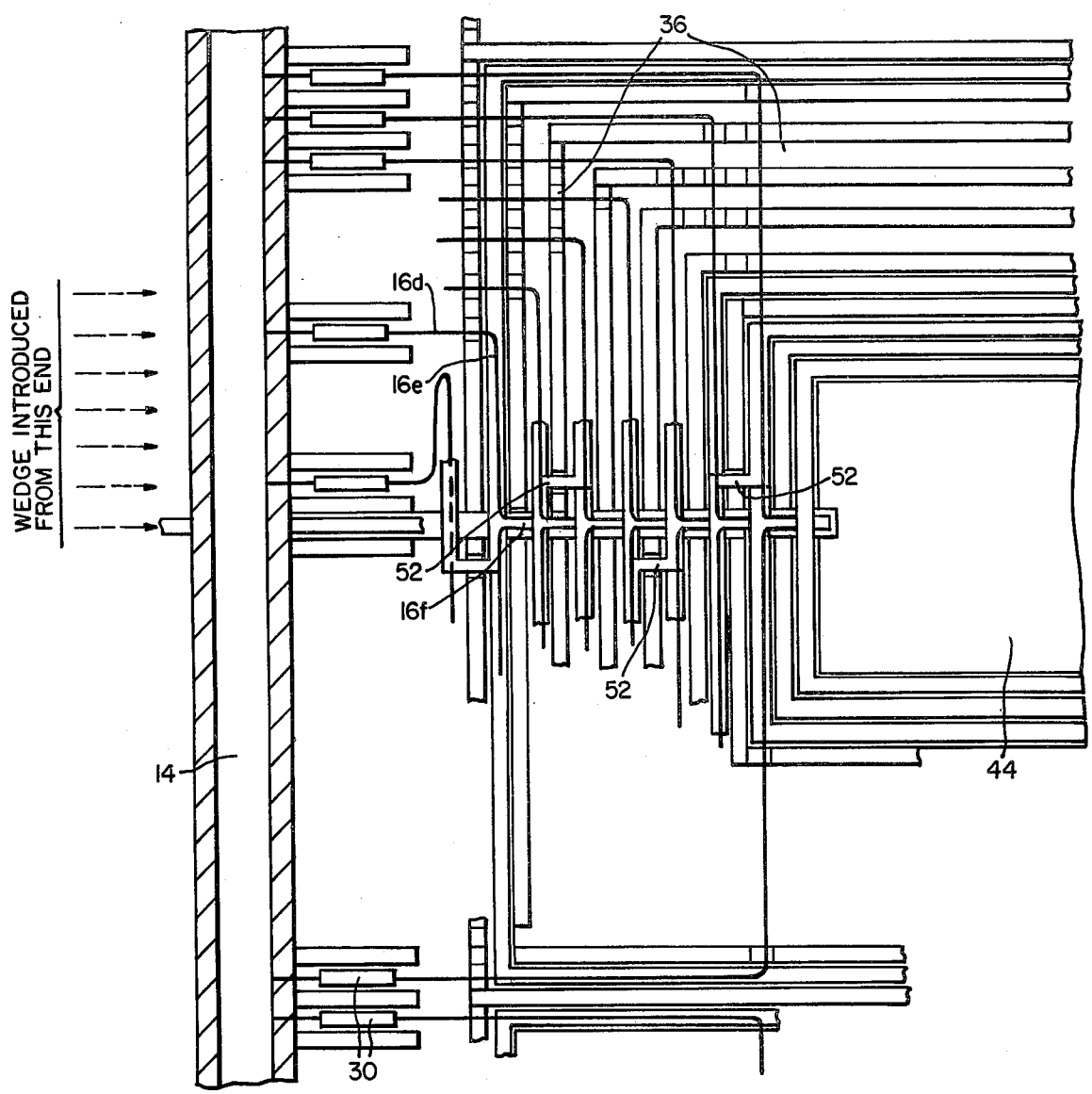
FIGS. 9A, 9B and 9C illustrate a third embodiment of the present invention.
Figure 9A:
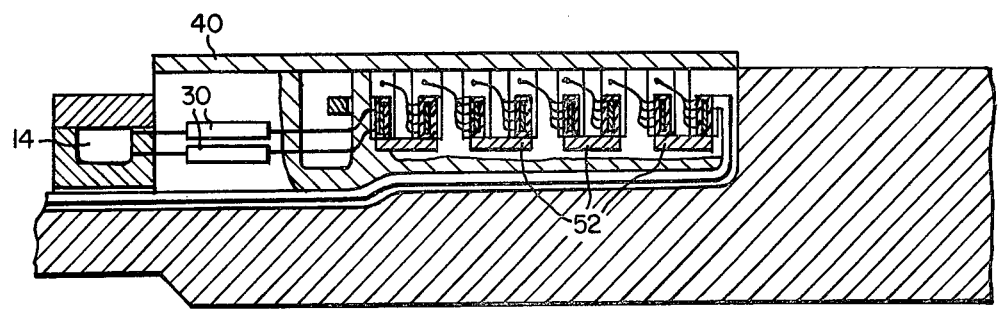
Figure 9C:
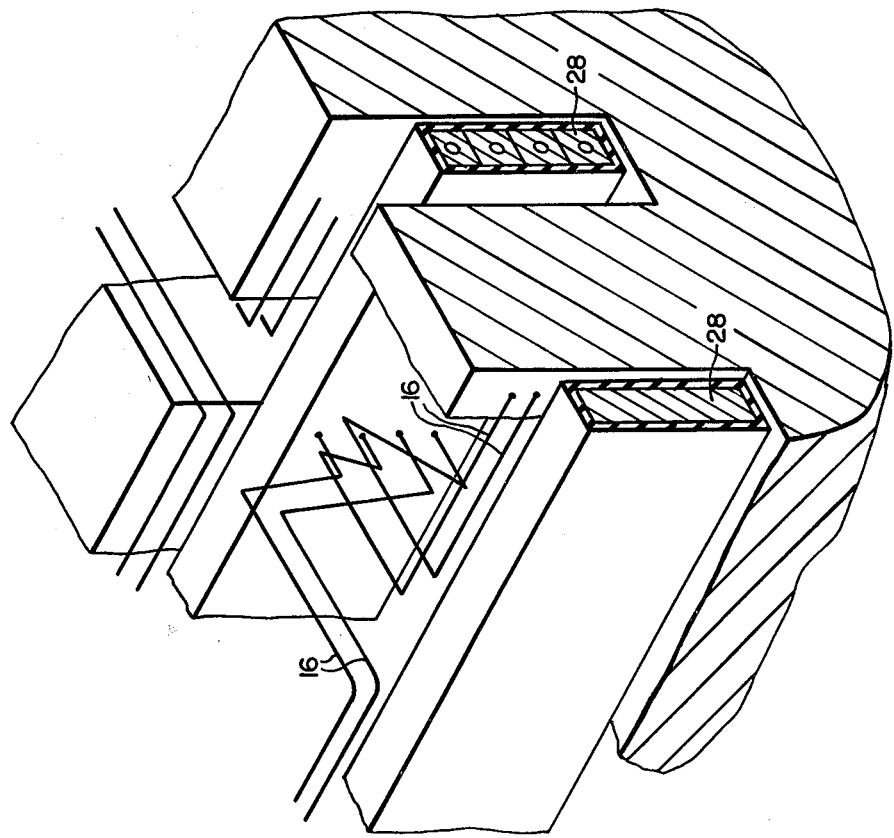

FIGS. 9A and 9B are partial sectional views of a third embodiment of a liquidly cooled rotor structure having embedded end turns. Coolant conduits illustrated in FIGS. 9A and 9B enter each of the coils and conductors included therein along the centerline of pole 44 in the longitudinal slot situated there. The coolant conduits for the configuration illustrated in FIGS. 9A and 9B also constitute three segments 16d, 16e and 16f. Segments 16d and 16f are seen to be axially extending with at least a portion of each being in a longitudinal slot 36, while coolant conduit segment 16e is an arcuate portion which connects segments 16d and 16f. Segment 16e lies above the embedded end turns in circumferential slots 38. Crossovers 52 which serially connect coils in adjacent circumferential and longitudinal slots are slightly offset from the centerline of pole 44 where the coolant conduit connections are made. An enlarged partial sectional view of the coolant connections to the embedded end turns 28 is illustrated in FIG. 9C, where it can be seen that two coolant conduits 16 approach pole 44's centerline from each circumferential direction within the circumferential slots 38 radially above the embedded end turns 28. In causing coolant conduits 16 to approach pole 44's centerline from different circumferential directions, a minimum of space is required above the embedded end turns 28 for the coolant conduits 16.

Figure 10:
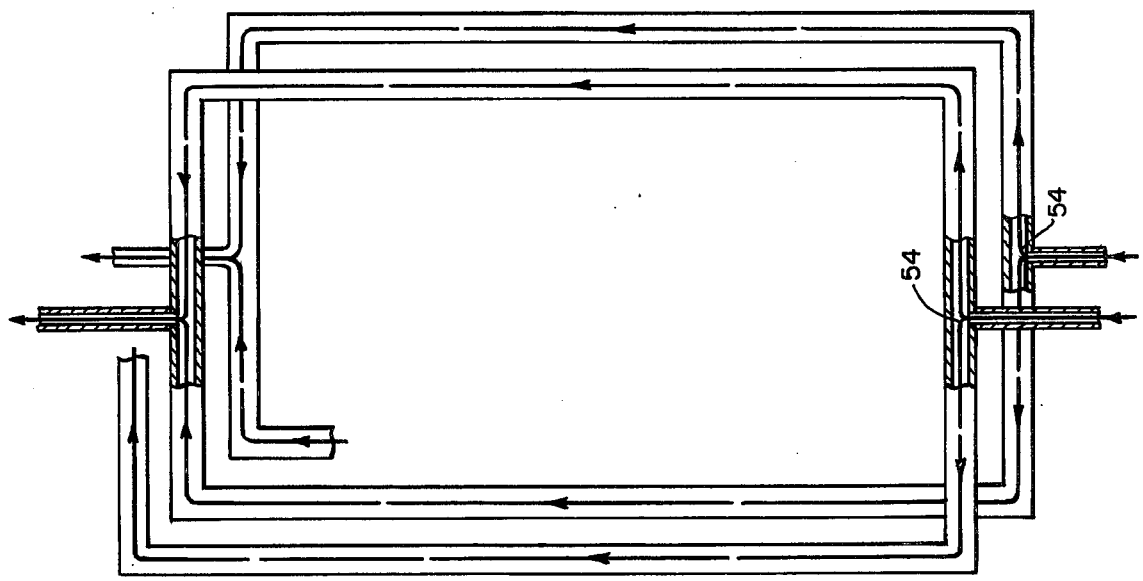
FIG. 10 is a schematic representation of the coolant flow for the invention's configuration illustrated in FIGS. 9A, 9B, and 9C.

FIG. 10 schematically illustrates the cooling flow pattern utilized in FIGS. 9A and 9B. Coolant enters the circumferential middle 54 of each conductor constituting each end turn 28. Coolant flow path length is, for this embodiment, the same regardless of which circumferential direction is chosen. While equalization of flow path length seems an advantage over the cooling scheme schematicized in FIG. 8, it is to be understood that coolant flow rates in any branch of any of the aforementioned coolant schemes may be regulated by inserting restrictions within or by adjusting the size of the coolant conduits 16 accordingly. Relatively equal coolant flow rates are necessary to provide the same average cooling for all conductors of all coils since relative growth of the conductors due to differential thermal expansion can cause friction, heat, and stress within the conductors.

While generators alone have been discussed, it is to be understood that the present invention may be utilized in any dynamoelectric machine having a field winding distributed on a rotatable shaft. While only the distribution chamber's end of the dynamoelectric machine rotor 12 has been illustrated in the figures, it is to be understood that the rotor construction at the discharge end is substantially the same, and thus, the need for discussion thereof has been obviated.

It will now be apparent that an improved system for cooling dynamoelectric machine rotor coils has been provided in which liquid coolant is utilized to remove heat from the field winding coils and increase the efficiency of the utilizing dynamoelectric machine. Liquid cooling of the rotor's coils permits increased utilizing machine ratings to be obtained when compared with gas cooled rotor coils from machines of the same size. Additionally, the cooling scheme has been shown to be compatible with rotor constructions utilizing embedded end turns 28 rather than retaining rings for constraining the coil end turns 28.

I claim:
1. A dynamoelectric machine comprising:
   a rotor member having electrical coils disposed thereon about a plurality of poles, said coils having portions disposed in intersecting, longitudinal and circumferential slots formed in said rotor, said circumferential slots being situated on both axial ends of said rotor;
   means for liquidly cooling said electrical coils, said liquid cooling means comprising:
   coolant openings in said coils for passing coolant therethrough;
   coolant distribution and discharge chambers disposed at opposite axial ends of said rotor; and
   a plurality of conduits extending from said chambers to said coolant openings for transmitting coolant therethrough, said conduits each having a first portion disposed in said longitudinal slots, said first conduit portions axially traversing said coil portions disposed in said circumferential slots.
2. The dynamoelectric machine of claim 1, further comprising:
   means for electrically insulating said coils from said chambers.
3. The dynamoelectric machine of claim 1 wherein said first conduit portions are disposed radially outside said circumferentially disposed coil portions.
4. The dynamoelectric machine of claim 3, further comprising:
   a plurality of rigid channel members for housing said conduits' first portions to prevent deformation thereof by said underlying coils during rotor rotation.
5. The dynamoelectric machine of claim 1 wherein said first conduit portions are disposed radially inside said circumferential slot disposed coil portions.
6. The dynamoelectric machine of claim 5, further comprising:
   a plurality of rigid channel members for housing said first conduit portions to prevent deformation thereof during rotor rotation.
7. The dynamoelectric machine of claim 1 wherein second portions of said conduits are disposed in said circumferential slots.
8. The dynamoelectric machine of claim 7 wherein said second conduit portions are disposed radially outside said circumferential coil portions.
9. The dynamoelectric machine of claim 1 further comprising:
   said conduits having a second portion cooperatively configured with said first portion to form an angle therebetween of 90° or less.
10. The dynamoelectric machine of claim 1, further comprising:
    means for regulating coolant flow through the conduits to provide a substantially uniform temperature in said coils.

* * * * *